United States Patent

Hamburg

[15] 3,673,476
[45] June 27, 1972

[54] SIGNAL PRODUCING APPARATUS ADAPTABLE FOR USE WITH VARIABLE RELUCTANCE MOTORS

[72] Inventor: Douglas R. Hamburg, Birmingham, Mich.
[73] Assignee: Ford Motor Company, Dearborn, Mich.
[22] Filed: March 8, 1971
[21] Appl. No.: 121,655

[52] U.S. Cl. ............................................................ 318/138
[51] Int. Cl. ......................................................... H02k 29/00
[58] Field of Search ........................... 317/5, 6; 318/313, 138; 324/175

[56] References Cited

UNITED STATES PATENTS

| | | | |
|---|---|---|---|
| 3,023,348 | 2/1962 | Cox | 318/138 |
| 3,317,804 | 5/1967 | Baker | 318/138 |
| 3,509,392 | 4/1970 | Snowdon | 318/138 |
| 3,577,049 | 5/1971 | Madurcki | 318/138 |
| 3,418,550 | 12/1968 | Kolatorowicz | 318/138 |
| 3,104,323 | 9/1963 | Over, Jr. | 324/175 |

Primary Examiner—Bernard A. Gilheany
Assistant Examiner—Thomas Langer
Attorney—John R. Faulkner and Robert W. Brown

[57] ABSTRACT

A circuit is described for producing periodic electrical signals upon the repeated sequential activation of a plurality of sensor units. The sensor units preferably include solid state switching devices in the form of light-activated silicon-controlled rectifiers. The circuit may be used to indicate the relative angular velocity of one body rotating with respect to another body. In such case, the electrical signals have frequencies proportional to the angular velocity of the rotating body. When applied to disc-type variable reluctance motors, the circuit may be used with additional apparatus to indicate the position of the motor's rotor relative to its stator. The signal indicative of rotor position may be used for purposes of variable reluctance motor speed and torque control.

7 Claims, 7 Drawing Figures

INVENTOR.
DOUGLAS R. HAMBURG

INVENTOR.
DOUGLAS R. HAMBURG
BY John R. Faulkner
Robert W. Brown
ATTORNEYS

SIGNAL PRODUCING APPARATUS ADAPTABLE FOR USE WITH VARIABLE RELUCTANCE MOTORS

BACKGROUND OF THE DISCLOSURE

This invention relates to a circuit and apparatus for producing periodic electrical signals upon the repeated sequential activation of a plurality of sensor units. The sensor units preferably include solid state switching devices in the form of light-activated silicon-controlled rectifiers. The circuit may be used in combination with associated apparatus to produce a periodic electrical signal having a frequency proportional to the angular velocity of one body which rotates with respect to a second body. The circuit and apparatus of the invention are particularly suitable for use with disc-type variable reluctance motor to indicate the position of the rotor relative to the stator.

Apparatus for producing a periodic electrical signal having a frequency proportional to the angular velocity of a first body rotating relative to a second body is known in the art. For example, it is known to attach a ferromagnetic toothed wheel to the rotating first body. A coil is located near the teeth of the rotating wheel so that, as the wheel teeth rotate past the coil, an electrical signal having a frequency proportional to the angular velocity of the rotating toothed wheel is produced. However, apparatus of this kind is not ideally suited for use with variable reluctance motors because of the presence of large magnetic fields in such motors. Moreover, in such motor applications, it is desirable to produce an electrical signal indicative of rotor position which has particular characteristics to be more fully described hereinafter.

A disc-type variable reluctance motor is a device which has one or more windings or phases and which has a plurality of spaced, high magnetic permeability sections in its stator and a corresponding number of spaced, high magnetic permeability sections in its rotor. As the rotor rotates, the high permeability sections of the rotor move into and out of alignment with the high permeability sections of the stator. As the rotor sections move into alignment with the stator sections, the magnetic permeance (reciprocal of reluctance) increases, as does the winding inductance. When the sections are moving out of alignment, the magnetic permeance and winding inductance decrease. The application of ampere-turns to the winding or windings during intervals of increasing magnetic permeance and winding inductance produces positive torque. However, the application of winding ampere-turns during intervals of decreasing magnetic permeance and winding inductance produces negative torque or a braking action. Controller circuitry is required to supply ampere-turns to the motor winding or windings at appropriate intervals in the variable inductance. The manner in which the controller circuitry operates to supply electrical energy to the motor winding or windings may be determined by appropriate logic circuitry.

In order for the logic circuitry to function in variable speed applications, it is necessary that it be provided with information concerning the position of the high permeability rotor sections of the variable reluctance motor relative to the high permeability sections of the stator thereof. The apparatus of the invention may be used to provide such position sensing information.

SUMMARY OF THE INVENTION

In accordance with the invention, apparatus and circuitry are provided for producing a periodic electrical signal having a frequency proportional to the angular velocity of a first body rotating relative to a second body. The apparatus may be adapted for use with a variable reluctance motor to provide a signal indicative of motor winding inductance variation. Moreover, the novel circuitry of the invention may be used to provide a plurality of signals to indicate the winding inductance variation of a plurality of phase windings in a variable reluctance motor.

The novel circuitry of the invention includes a plurality of interconnected circuit means for producing periodic electrical signals having frequencies corresponding to the activation rate of sensor units coupled to or included within the circuit means. The sensor units preferably are solid state switching devices in the form of light-activated silicon-controlled rectifiers. Where the apparatus and circuitry of the invention is to supply an electrical signal having a frequency proportional to the angular velocity of a first body rotating with respect to a second body, the sensor units are mounted in stationary position with respect to the second body. As applied to a variable reluctance motor, to indicate winding inductance variation or rotor angular velocity, the sensor units could be mounted, for example, on the motor stator.

As was stated above, each of the sensor units is coupled to circuit means for producing an electrical signal. Activation of the sensor unit, such as by the impingement of light thereon if it is a light-activated device, produces a change in the conductive state of a solid state switching device within the circuit means to which the sensor unit is coupled, thereby, to produce a change in the electrical signal at the output terminal of the circuit means. The subsequent activation of another sensor unit produces a similar change in the signal at its output terminal and preferably simultaneously returns the first circuit means output signal to its original condition. The sequential activation of a third sensor unit produces a similar change in the signal at its output terminal and preferably returns the signal at the output terminal of the preceding circuit means to its original state. Additional sensor units and circuit means coupled thereto may be provided to produce similar changes in their output signals. The activation sequence of the various sensor units may then be repeated to produce periodic electrical signals at the respective output terminals of the various circuit means, these periodic signals having a frequency equal to the activation rate of the sensor units. The circuit means may be provided with a current path or circuitry for rendering ineffective whatever means are provided for activating the sensor units.

In an embodiment of the invention particularly suitable for use with a variable reluctance motor, the sensor units are mounted alongside one another and are maintained in a spaced relation with respect to a plurality of light sources. An apertured disc rotates within the space between the light sources and the sensor units. Light from the light sources repeatedly and sequentially impinges upon the sensor units to activate them at a rate proportional to the angular velocity of the motor rotor. Thus, the intermittent interruption of the impingement on the sensor units of the light rays from the light sources repeatedly and sequentially activates the sensor units.

The term "light" or "light source" as used herein refers to electromagnetic radiation capable of activating the sensor units employed. For example, in the case of a sensor unit comprising a light-activated silicon-controlled rectifier, the light source utilized need not necessarily produce electromagnetic radiation within the visible portion of the spectrum. Although such devices typically may be activated by the radiation from a simple light bulb, nevertheless, they are usually most sensitive to radiation in the infrared region of the electromagnetic spectrum.

The invention may be better understood by reference to the drawings and to the detailed description which follows.

DETAILED DESCRIPTION

Figure 1:
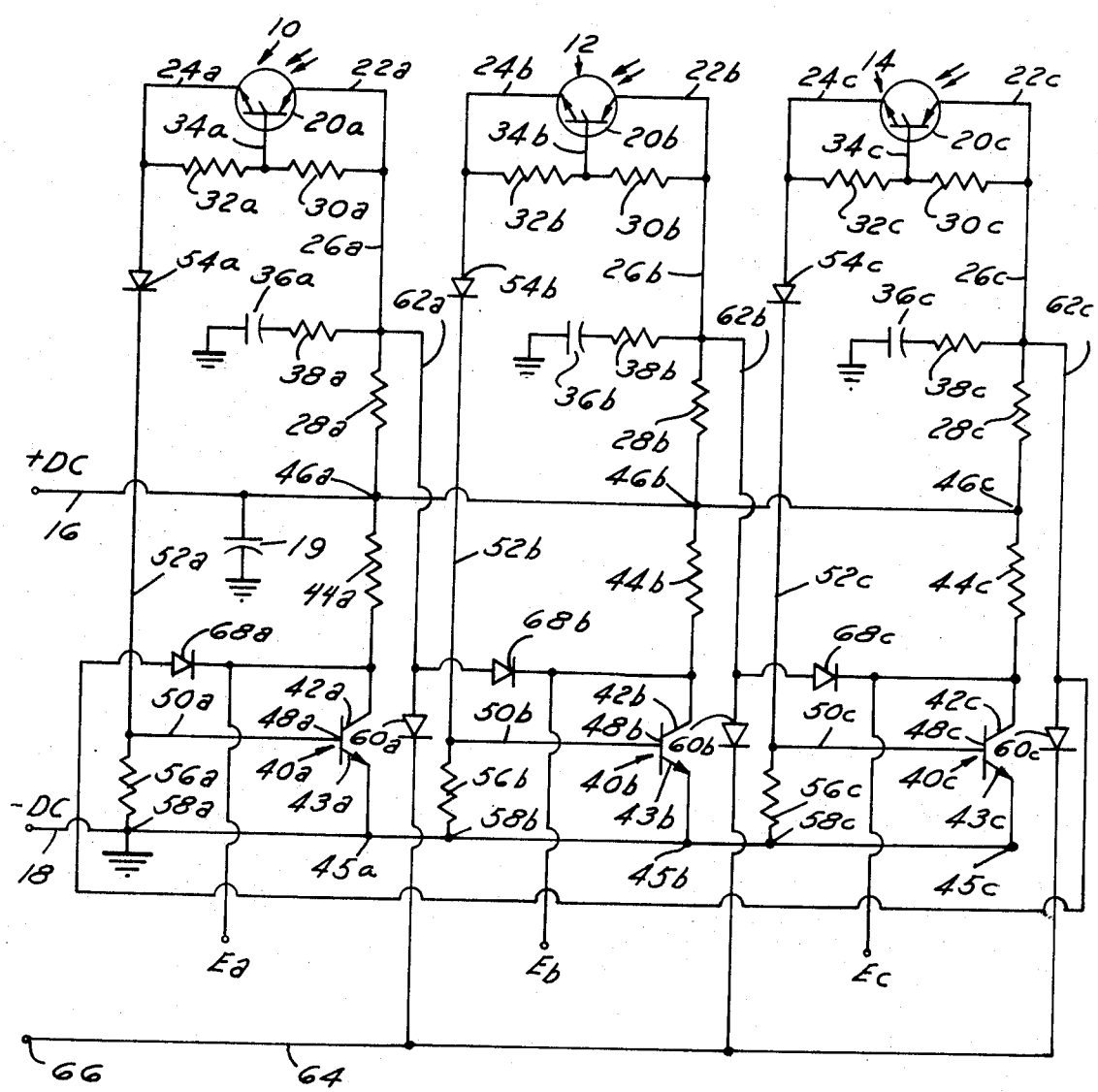
FIG. 1 is a schematic diagram of circuitry constructed in accordance with the invention.

With reference to the schematic diagram of FIG. 1, there is shown circuitry comprised of three interconnected and similar circuits 10, 12, and 14. The circuitry of the invention requires the inclusion of at least three of these interconnected and repetitive circuits. Where desired, a plurality of similarly interconnected circuits in excess of this minimum number may be used. For purposes of brevity, only one of these interconnected circuits is described in the paragraphs which follow, except for the description of the various interconnections. For convenience, the various elements in the repetitive circuit 10 are designated by a numeral followed by a lower case letter. Corresponding elements in the circuits 12 and 14 are given identical numeric designations followed by different lower case letters. The circuits 10, 12, and 14 are supplied with a direct current source of electrical energy, the positive terminal of the DC source being connected at the terminal 16 and the negative terminal of the source being connected at the grounded terminal 18. A capacitor 19, connected across the source of electrical energy, may be provided to protect the circuit against spurious voltages. The circuit 10 has a sensor unit 20a coupled to it, the sensor unit preferably comprising a solid state switching device in the form of a light-activated silicon-controlled rectifier (LASCR). Sensor units 20b and 20c are also LASCRs.

The sensor unit 20a has a first terminal 22a, which is the anode of the LASCR, and a second terminal 24a, which is the cathode of the LASCR. The small arrows in the symbol for the LASCR indicate the impingement of light rays on the device. A current path 26a connects the anode 22a through a resistor 28a to the positive terminal of the DC source of electrical energy. Connected across the anode and cathode of the LASCR 20a are two resistors 30a and 32a. The gate terminal 34a of the LASCR 20a is connected to the junction of the resistors 30a and 32a.

One of the characteristics of silicon-controlled rectifiers is that they are limited by the magnitude of the time rate of change of forward voltage (dv/dt) which they can withstand without braking down. Although it is not always necessary, a capacitor 36a and a resistor 38a are connected in series, and the series combination of these elements is placed between the current path or line 26a and ground to limit the time rate of change of voltage applied to the LASCR 20a.

The circuit 10 includes a solid state switching device in the form of a transistor 40a. The transistor 40a has a collector 42a connected through a resistor 44a to the source of DC energy at the point 46a. The emitter 43a of the transistor 40a is connected to ground at 45a. The base 48a is of the transistor 40a is connected through the conductive paths or lines 50a and 52a to the second terminal or cathode 24a of the LASCR 20a. The current path 52a includes an isolation diode 54a having its anode connected to the junction of the LASCR cathode 24a with one terminal of the resistor 32a. The cathode of the isolation diode 54a is connected to the base of the transistor 48a and to one terminal of a resistor 56a, the other terminal of which is connected to ground at 58a.

Current path means for simultaneously rendering ineffective the means for activating the LASCR sensor units for the circuits 10, 12 and 14 are provided. The current path means comprises diodes 60a, 60b, and 60c having their anodes connected, respectively, by conductors 62a, 62b, and 62c to the anodes of the LASCRs 20a, 20b, and 20c. The cathodes of the isolation diodes 60a, 60b, and 60c are connected to the common conductor 64 which has a blanking signal input terminal 66.

The circuits 10, 12, and 14 are interconnected. Circuit 10 is interconnected with circuit 12 through an isolation diode 68b having its anode connected to the conductor 62a and having its cathode connected to the collector 42b of the transistor 40b. Circuit 12 is interconnected with the circuit 14 in an identical manner through the isolation diode 68c, and the circuit 14 is interconnected with the circuit 10 through the isolation diode 68a.

Output signals $E_a$, $E_b$, and $E_c$ for the circuits 10, 12, and 14, respectively, are taken at the collectors 42a, 42b, and 42c of the transistors 40a, 40b, and 40c.

The circuitry of FIG. 1 may be comprised of components of the following types or values:

| | |
|---|---|
| Light Activated Silicon-Controlled Rectifiers 20a, 20b, and 20c | Type L9U |
| Diodes 54a, 54b, 54c, 60a, 60b, 60c, 68a, 68b, and 68c | Type 1N914 |
| Transistors 40a, 40b, and 40c | Type 2N4275 |
| Resistors 28a, 28b, and 28c | 10 Kilohms |
| Resistors 30a, 30b, and 30c | 5.1 Megohms |
| Resistors 32a, 32b, and 32c | 56 Kilohms |
| Resistors 38a, 38b, and 38c | 100 Ohms |
| Resistors 44a, 44b, and 44c | 5.1 kilohms |
| Resistors 56a, 56b, and 56c | 1.0 Kilohms |
| Capacitors 36a, 36b, and 36c | .01 Microfarad |
| Capacitor 19 | 1 Microfarad |
| DC Voltage | 12 Volts |

In order to facilitate the description of the operation of the circuitry of FIG. 1, it is assumed that the LASCRs are initially unactivated, that is, in a nonconductive state. Because the LASCRs 20a, 20b, and 20c are nonconductive, the anode to cathode voltages across them are about equal to the DC source voltage and is applied through the resistors 28a and 56a, 28b and 28c and 56c, respectively. Because this voltage drop appears across the LASCR, the conductors 50a, 50b, and 50c are at or near ground potential. Since these conductors are connected to the bases 48a, 48b, and 48c of the transistors 40a, 40b, and 40c, respectively, these transistors are also nonconductive.

Let it be supposed that a light source momentarily supplies light rays to the LASCR 20a of circuit 10 to render it conductive. (The current supplied to the gate terminal 34a of the LASCR by the voltage divider network comprised of the very high resistance 30a and the much lower resistance 32a serves the purpose of reducing the amount of light required to activate the LASCR.) Once the LASCR 20a has been rendered conductive by the light source, it remains in that state as long as adequate anode to cathode voltage exists to maintain a sufficient current. In its conductive state, the LASCR 20a has an anode to cathode voltage of, for example, 1.5 volts. The absolute value of the voltage on the anode 22a of the LASCR 20a is determined primarily by the values of the resistances 28a and 56a.

When the LASCR 20a becomes conductive, the voltage on the conductor 50a connected to the base 48a of the transistor 40a becomes more positive with respect to ground. This produces a base-to-emitter current sufficient to cause the transistor 40a to become conductive, and conventional current flows from the point 46a, through the resistor 44a, and through the transistor collector 42a the emitter 43c connected to ground at 45a. The change in the conductive state of the transistor 40a causes the output voltage $E_a$ to change from a value approximately equal to the DC source voltage to a value equal to the transistor collector-to-emitter voltage $V_{CE}$, this collector-to-emitter voltage typically being about 0.1 volts.

In summary, the incidence of light rays on the LASCR 20a causes it to become conductive. This also causes the transistor 40a to become conductive so that the output voltage $E_a$ changes from a value near the DC source potential to a much lower voltage level. The lower output voltage level $E_a$ is maintained as long as the LASCR 20a remains in its conductive state.

Let it now be supposed that light rays are incident upon the LASCR 20b to cause it to become conductive. In a manner similar to that described in connection with the circuit 10, the transistor 40b becomes conductive so that the output voltage $E_b$ becomes very low. Because the collector 42b of the transistor 40B is interconnected with the anode 22a of the LASCR 20a of circuit 10 through the conductor 26a, the conductor 62a, and the forward-biased diode 68b, the voltage on the anode 22a of the LASCR 20a also becomes very low. When this occurs, the current from the anode 22a to the cathode 24a becomes insufficient to maintain conduction of the LASCR 20a. Thus, it becomes nonconductive when the transistor 40b becomes conductive.

Let it now be supposed that light rays are incident upon the LASCR 20c so that it becomes conductive. The transistor 40c then becomes conductive so that the output voltage $E_c$ becomes very low. Again, because of the interconnection between the circuits 12 and 14, the LASCR 20b becomes nonconductive as a result of the insufficient current from its anode 22b to its cathode 24b. This causes the transistor 40b to become nonconductive and raises the output voltage $E_b$ to a value at or near the voltage level of the DC source. Also, when the transistor 40b becomes nonconductive, the diode 68b is once again reverse-biased. This, in turn, causes the full DC voltage to be applied between the anode and cathode of the LASCR 20a. The combination of the capacitor 36a and the resistor 38a limits the time rate of change of voltage across the LASCR 20a, thus, preventing breakdown (conduction) of the LASCR 20a which might otherwise result from the abrupt application of the forward voltage.

From the above, it is apparent that the sequential activation of the sensor units 20a, 20b, and 20c of the circuits 10, 12, and 14, respectively, produces a change in their respective output signals $E_a$, $E_b$, and $E_c$. These changes are from a high voltage level to a low voltage level and then back again to the high voltage level. Thus, activation of sensor unit 20a causes the output voltage $E_a$ to change from a high value to a low value. The subsequent activation of the sensor unit 20b causes the output voltage $E_a$ to return to its high value and causes the output voltage $E_b$ to change from a high value to a low value. The subsequent activation of the sensor unit 20c causes the output voltage $E_b$ to return to its high value and causes the output voltage $E_c$ to change from its high value to a low value. Repetition of the sequential activation of the sequential activation of the sensor units of circuits 10, 12, and 14 again produces a sequential change in the respective output voltages. In this manner, the repetitive and sequential activation of the sensor units produces output signals having a frequency corresponding to the activation rate of the sensor units. If the sensor units are repetitively and sequentially activated by light means coupled to a first body rotating relative to a second body, the output signals $E_a$, $E_b$, and $E_c$ produced are periodic and have frequencies proportional to the angular velocity of the first body rotating relative to the second body.

The sensor units 20a, 20b, and 20c are activated by light rays which cause them to become conductive to produce changes in the output signals $E_a$, $E_b$, and $E_c$. However, it is sometimes desirable to render ineffective the means for activating the sensor units. With the circuitry of FIG. 1, this can be accomplished by the connection of the blanking terminal 66 to a point at or near ground potential. Because the anodes 22a, and 22b, and 22c of the senor units are connected to terminal 66 through conductive lines 62a, 62b, and 62c and through diodes 60a, 60b, and 60c, respectively, the sensor units cannot become conductive because the anode to cathode voltage is insufficient.

Figure 2:
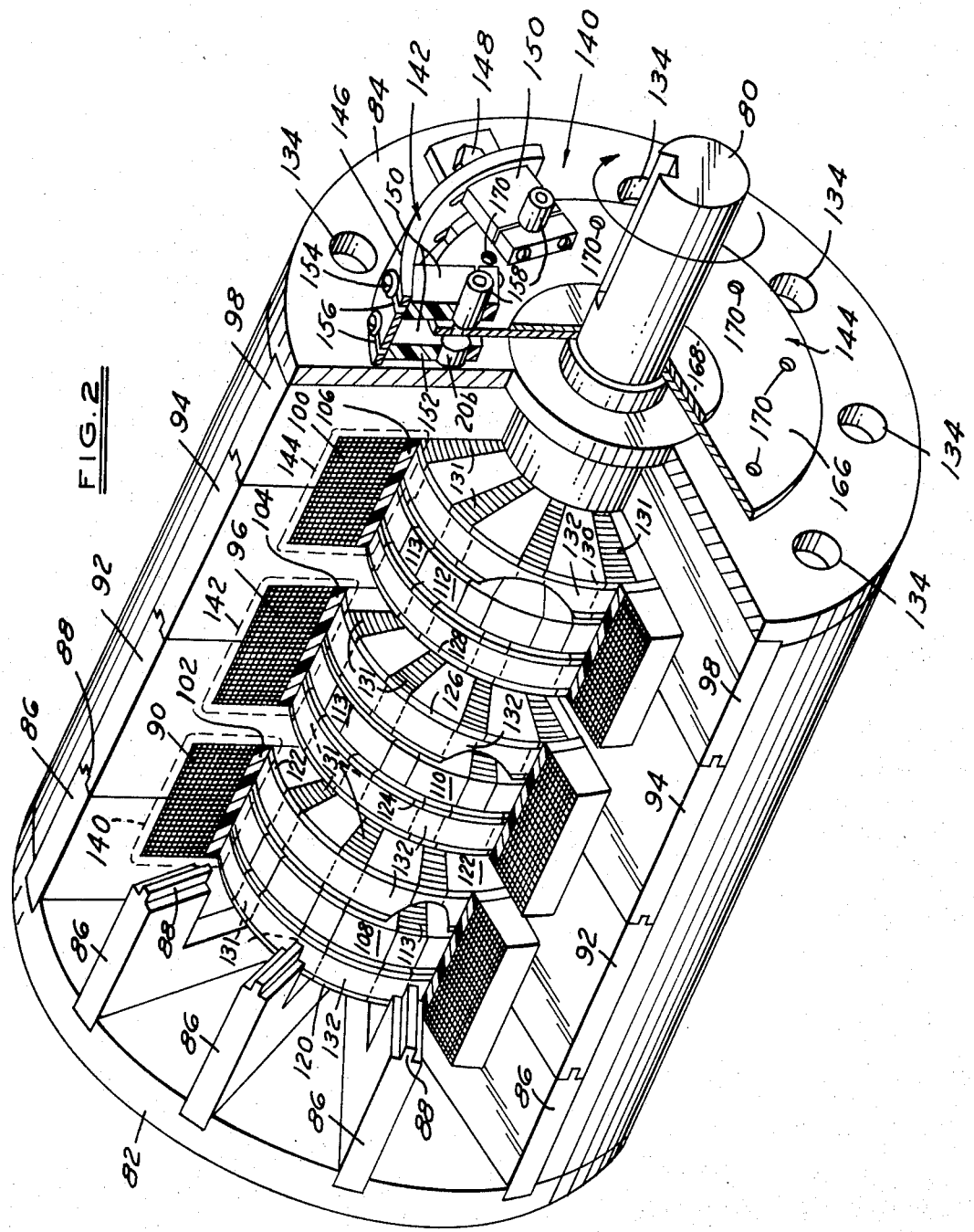
FIG. 2 is a partially sectioned pictorial view of a three phase variable reluctance motor having sensor units mounted thereon.

The manner in which the circuitry of FIG. 1 may be applied to a variable reluctance motor to provide an indication of the inductance variations therein will now be described. With particular reference now to FIG. 2, there is shown a sectional view of a three phase disc-type variable reluctance motor having attached thereto light-activated sensor units such as those shown schematically in the circuit of FIG. 1. In FIG. 2, a motor shaft 80 is rotatably mounted in two end plates 82 and 84. A plurality of L-shaped members 86 have their longer legs positioned in shallow grooves on the interface of the end plate 82. The shorter legs of the members 86 project axially inward with the outer surfaces thereof at the approximate level of the outer periphery of the end plate 82. The members 86 are made of laminated steel with the laminations running parallel to the shaft axis and have small radially directed tongues 88 at the inner surfaces of the shorter legs.

A helically wound, toroidally shaped first phase winding 90 has one-half of its width fitting into the steps of L-shaped members 86 and is held in place by a plurality of T-shaped members 92. The members 92 have a groove cooperating with the tongue 88. Similar T-shaped members 94 hold the winding 96 of the second phase in place against the members 92, and L-shaped members 98 cooperate with the T-shaped members 94 to hold the winding 100 of the third phase in place. The members 92, 94 and 98 also are made of laminated steel.

Rims 102, 104, and 106 of fiberglass are positioned against the radially interior surfaces of the respective windings 90, 96, and 100 and are connected to the outer peripheries of respective stator discs 108, 110, and 112. Each stator disc comprises a plurality of pie-shaped laminated steel sections 113 separated by a material having a low magnetic permeance, such as a reinforced phenolic resin. The number of sections 113 in each disc corresponds to the number of L-shaped members 86, and the sections in each stator disc are aligned with the members 86.

Rotor discs 120 and 122 are fastened to the shaft 80 and positioned on each side of the stator disc 108 to complete the first phase of the motor. Similarly, rotor discs 124 and 126 are positioned on each side of the stator disc 110, and rotor discs 128 and 130 are positioned on each side of the stator disc 112, to complete the second and third phases. Each rotor disc also has pie-shaped sections 131 of laminated steel surrounded by sections of low permeance material. In a three phase motor, the laminated sections of both the stator discs and the rotor discs have a peripheral width approximately corresponding to the width of members 86 and are surrounded on each side by twice this width of the lower permeance material. In single phase and two phase motors (not shown), the laminated sections of both the stator and rotor have a peripheral width approximately equal to the width of the lower permeance material.

A narrow groove is cut into the periphery of each rotor disc. This groove is filled with a high strength layer of fiberglass 132. Laminated sections 131 of the rotor disc in each phase are aligned with each other. Additionally, the laminated sections of the rotor disc in the second phase are spaced peripherally by the width of a section from the laminated sections of the rotor disc in the first phase, and the laminated sections of the rotor disc in the third phase are spaced in the same direction by the width of a laminated section from the corresponding sections of the rotor discs in the second phase. Thus, when the sections 131 of the rotor discs 120 and 122 are aligned with the sections 113 of the stator disc 108, sections 131 of the rotor discs 124 and 126 are aligned with imaginary sections of the stator disc 110 adjacent its laminated sections, and sections 131 of the rotor discs 128 and 130 are aligned with imaginary sections of the stator disc 112 adjacent its laminated sections but located on the sides opposite the imaginary sections of the stator disc 110. Long bolts pass through appropriate holes 134 in the end plates 82 and 84 to clamp the parts of the motor together.

The magnetic flux paths for the three phases of the motor are illustrated, respectively, by the broken lines 140, 142, and 144. An interval of increasing magnetic permeance for these flux paths begins approximately at the time that the front edges of the laminated rotor sections 131 first begin to come into axial alignment with the stator sections 113 of the motor. In FIG. 2, in which clockwise rotation of the shaft 80 is assumed, the rotor sections 131 of the third phase are at the point at which the magnetic permeance is just beginning to increase as the result of the approaching alignment of the rotor sections 131 with the stator laminated sections 113. The permeance continues to increase until the laminated sections 131 of the rotor are in full alignment with the laminated sections 113 of the stator, at which point the permeance begins to decrease. In order to produce positive motor torque, the motor winding must be supplied with winding current during intervals of increasing magnetic permeance. The variable reluctance motor can also be used for motor braking or it can be used as a generator, in which cases the winding is supplied with current during intervals of decreasing magnetic permeance.

The apparatus and circuitry of the invention may be used to indicate the intervals of increasing or decreasing magnetic permeance in the variable reluctance motor, the apparatus and circuitry thus acting as a motor position sensor. In FIG. 2, a position sensor assembly 140 is comprised of a stationary portion 142 mounted on the end plate 84 of the variable reluctance motor. A rotatable portion 144 is mounted on the motor shaft 80. The stationary portion 142 includes the light-activated sensor units shown schematically in FIG. 1.

Figure 3:
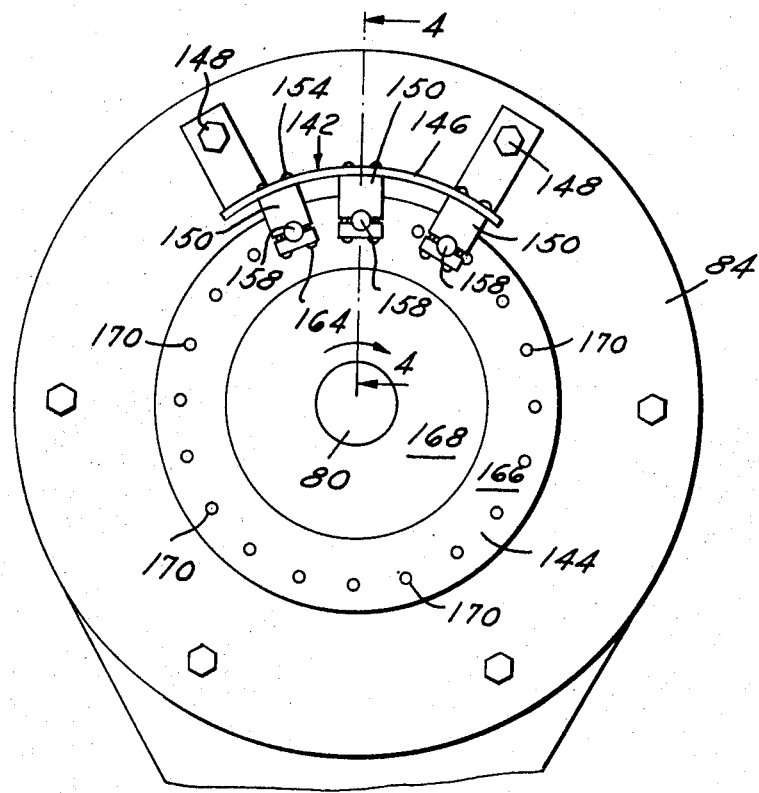
FIG. 3 is a front elevational view of the variable reluctance motor shown in FIG. 2.
Figure 4:
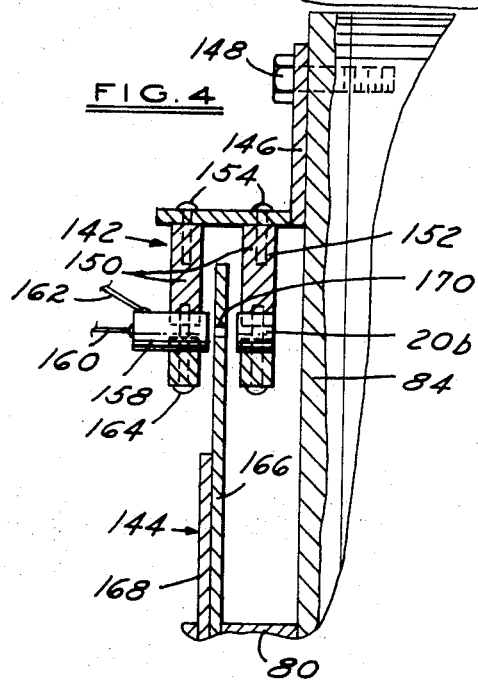
FIG. 4 is a partial sectional view of the variable reluctance motor shown in FIG. 2, the section being taken along the line 4—4 in FIG. 3.
Figure 5:
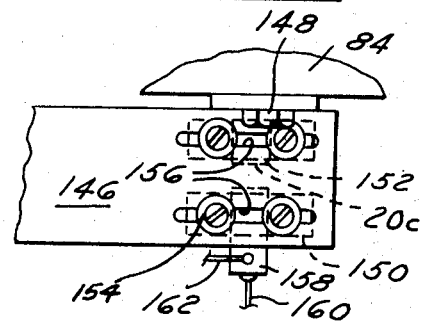
FIG. 5 is a partial plan view of mounting means for the sensor units attached to the stator of the variable reluctance motor shown in FIG. 2.

With particular reference now to FIGS. 3, 4, and 5, it may be seen that the stationary portion 142 of the sensor-unit apparatus includes a curved bracket member 146 attached with bolts 148 to the end plate 84 of the motor. Attached to the bracket 146 are the supports 150 and 152. The supports 150 are spaced from the supports 152 in the axial direction of the motor shaft 80. These supports preferably are made from an insulating material and are adjustably positioned on the curved portion of the bracket 46 by attachment screws 152 which pass through slots 156 (as may best be seen in FIG. 5) in the curved portion of the bracket 146. Each of the three supports 150 carries a light source in the form of a socket and light bulb assembly 158 having electrical leads 160 and 162. The light sources 158 are held in place by screws 164 which attach the lower portions of the supports 152 to their upper portions.

Each of the three supports 152 carries a sensor unit in the form of the light-activated silicon-controlled rectifiers 20a, 20b, and 20c. These three LASCRs are, respectively, spaced from the light sources 158 and are in axial alignment therewith.

The rotatable portion 144 of a position sensor assembly comprises a first disc member 166 and a second and smaller disc 168 used for support of the larger disc 166. The discs 166 and 168 are rotatable with the motor shaft 80. Also, the disc 166 is located within the space between the light sources 158 and the LASCRs 20a, 20b, and 20c. the disc 166 has a plurality of apertures 170 located therein, and it is preferred that these apertures correspond in number to the number of laminated sections 131 in each of the rotors of the variable reluctance motor. The apertures 170 are equally spaced on the outer portion of the disc 166 and are radially positioned thereon to enable them to come into axial alignment with the light sources 158 and the LASCRs 20a, 20b, and 20c.

In operation, the disc 166 rotates with the motor shaft 80. This causes the disc apertures 170 to repetitively come into and go out of alignment with the light sources and LASCRs. If the LASCRs are connected in a circuit such as that shown in FIG. 1, then the alignment of an aperture with a light source and a LASCR causes the LASCR to become conductive. This LASCR remains conductive until another LASCR is activated in a similar manner.

In FIG. 3, the disc 166 is shown to have a clockwise rotation. At the instant in time depicted, the center light source 158 and the LASCR 20b behind it are in alignment with one of the apertures 170 to render that particular LASCR conductive. Continued clockwise rotation of the disc 166 next activates the right-hand LASCR 20c as a result of an aperture coming into alignment with it and its light source. Following this, the left-hand LASCR 20a is activated, and then the center LASCR 20b is again activated. This repetitive and sequential activation of the three LASCRs produces the output signals $E_a$, $E_b$, and $E_c$ (FIG. 1) which have frequencies proportional to the angular velocity of the rotating motor shaft 80. Moreover, these signals may be used to indicate, respectively, the beginning and end of the intervals of increasing or decreasing magnetic permeance within the three phases of the motor. For example, this may be accomplished by positioning left-hand supports 150 so that the LASCR 20a is activated at the beginning of the interval of increasing magnetic permeance for the first phase of the motor, by positioning the center LASCR 20b supports 150 so that is LASCR is activated when the second phase begins its interval of increasing magnetic permeance, and by positioning the right-hand LASCR 20c carried by the supports 150 so that this LASCR is activated at the beginning of the interval of increasing magnetic permeance for the third phase. The proper position for the LASCR 20a may be determined by applying an alternating signal from a signal generator to the first phase of the motor winding and by then observing the alternating winding current produced thereby on an oscilloscope as the motor shaft is rotated by hand. The alternating winding current peak value will be at its maximum value when the magnetic permeance is at its lowest point, and will be at its minimum value when the magnetic permeance is greatest. This process may then be repeated for the LASCRs 20b and 20c for the second and third phases.

Figure 6:
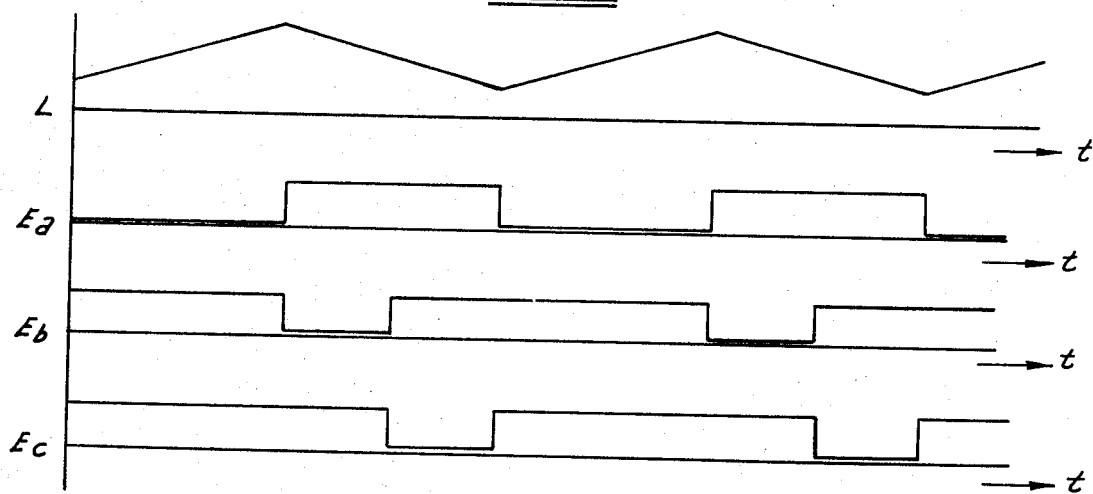
FIG. 6 illustrates the time variation of the winding inductance for a single phase variable reluctance motor and further illustrates periodic electrical output signals which may be obtained from circuitry constructed in accordance with the schematic diagram of FIG. 1.

The apparatus and circuitry of the invention may be used with variable reluctance motors having any number of windings. For example, in FIG. 6 the time variation of the inductance L of a single phase variable reluctance motor is shown, as are the time variations of the output voltages $E_a$, $E_b$, and $E_c$ of the circuitry shown in FIG. 1. It may be seen that the winding inductance L, which is proportional to the magnetic permeance of the winding, gradually increases from a minimum value to a maximum value, and then gradually decreases back to the minimum value. At this point the winding inductance L again increases gradually. Positive motor torque may be produced by the application of winding ampere turns during the intervals of increasing winding inductance. The output signal $E_a$ has its low value during these intervals of increasing winding inductance. Thus, the circuitry and apparatus of the invention operates as a position sensor to indicate these intervals of increasing winding inductance. The output signals $E_b$ and $E_c$ have their low values during the intervals of decreasing winding inductance.

Figure 7:
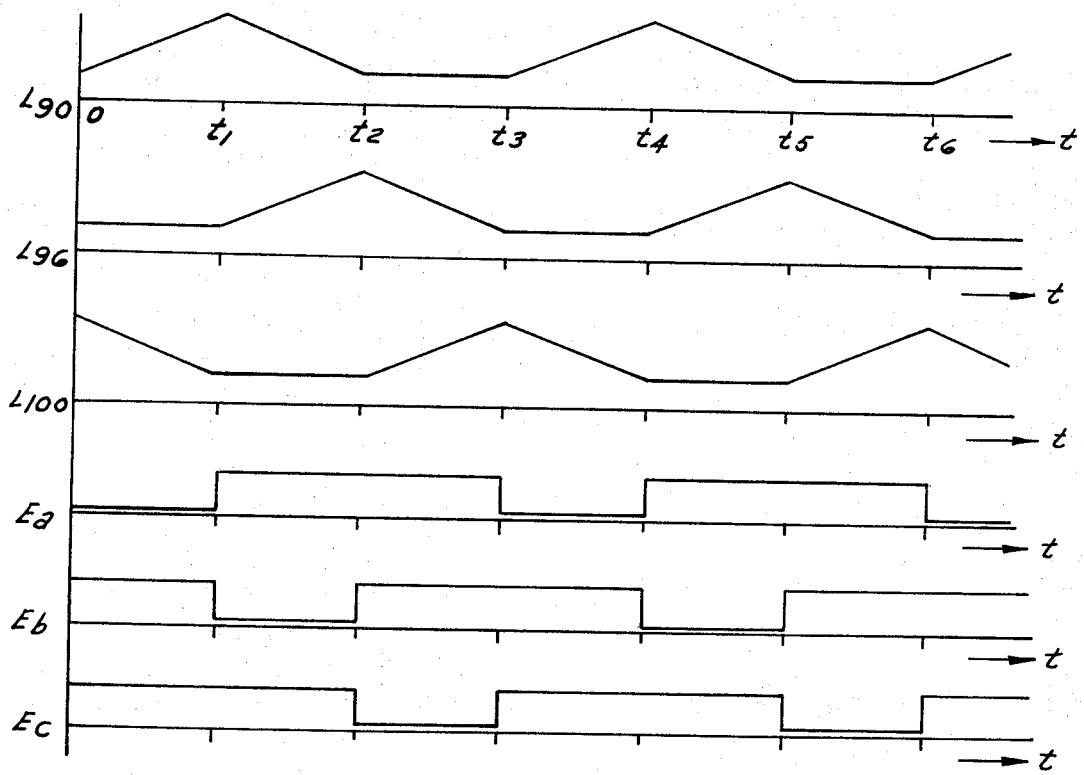
FIG. 7 illustrates winding inductance variations for a three-phase variable reluctance motor, such as that shown in FIG. 2, and also illustrates the periodic electrical output signals which may be obtained from circuitry constructed in accordance with that shown in the schematic diagram of FIG. 1.

FIG. 7 illustrates the time variation of the winding inductances and position sensor circuitry output voltages which occur during the rotation of the rotor of a three phase variable reluctance motor, such as the motor illustrated in FIG. 2. The upper three wave forms in FiG. 7 depict the inductances $L_{90}$, $L_{96}$, and $L_{100}$ of the motor windings 90, 96, and 100, respectively. At the time $t=0$, the inductance $L_{90}$ of the first phase winding begins to increase and this continues until a maximum value is reached at the time $t=t_1$. During this same time interval, the inductance $L_{96}$ of the second phase winding is constant, and the inductance $L_{100}$ of the third phase winding is decreasing from a maximum value to a minimum value. During the time interval from $t_1$ to $t_2$, the inductance $L_{90}$ changes from its maximum value to its minimum value, the inductance $L_{96}$ changes from its minimum value to its maximum value, and the inductance $L_{100}$ remains constant. During the interval from $t_2$ to $t_3$, the winding inductance $L_{90}$ is constant, the winding inductance $L_{96}$ decreases from its maximum value to its minimum value, and the winding inductance $L_{100}$ increases from its minimum value to its maximum value. The inductance cycles for the three phases are then repeated over the intervals from $t_3$ to $t_6$.

The position sensor apparatus and circuitry of the invention may be arranged to provide the output signals $E_a$, $E_b$, and $E_c$ shown in FIG. 7. The signals $E_a$ has a low value during time intervals in which the inductance $L_{90}$ of the first phase winding is increasing and has a high value at other times. Similarly, the output voltage $E_b$ has a low value when the inductance $L_{96}$ of the second phase winding is increasing and has a high value at other times. Also, the output voltage $E_c$ has a low value during intervals in which the inductance $L_{100}$ of the third phase winding is increasing and has a high value at other times. Thus, the output voltages $E_a$, $E_b$, and $E_c$ indicate the intervals of increasing winding inductance for the respective three phase-windings of the variable reluctance motor. Also, each of the output voltages $E_a$, $E_b$, and $E_c$ is periodic and has a frequency proportional to the angular velocity of the rotor of the variable reluctance motor.

Based upon the foregoing description of the invention, what is claimed and desired to be protected by Letters Patent is:

1. A circuit for producing a periodic electrical signal upon the repeated sequential activation of a plurality of solid state switching devices, which comprises: first, second, and third solid state switching devices, each of said devices having first and second terminals; means for sequentially and repeatedly activating said first, second, and third solid state switching devices, thereby, to render them conductive between said first and second terminals thereof; first, second, and third transistors having an emitter, a collector, and a base, said transistor bases being connected, respectively, to said second terminal of said first, second, and third solid state switching devices; circuit means for connecting said first terminal of said first solid state switching device to said collector of said second transistor; circuit means for connecting said first terminal of said second solid state switching device to said collector of said third transistor, and circuit means for connecting said first terminal of said third solid state switching device to said collector of said first transistor.

2. A circuit in accordance with claim 1, wherein said first, second, and third solid state switching devices are light-activated silicon-controlled rectifiers, said first terminals of said solid state switching devices being the anodes of said rectifiers, and said second terminals of said solid state switching devices being the cathodes of said rectifiers.

3. A circuit in accordance with claim 2, which further comprises means for rendering ineffective and means for sequentially and repeatedly activating said first, second, and third solid state switching devices.

4. Apparatus for producing a periodic electrical signal having a frequency proportional to the angular velocity of a first body rotating relative to a second body, which comprises: a plurality of light-activated sensor units, at least three in number, said sensor units being mounted in stationary positions with respect to said second body; means for repeatedly and sequentially activating each of said plurality of light-activated sensor units at an activation rate proportional to the angular velocity of said first body; and a plurality of interconnected circuit means for producing periodic electrical signals having frequencies corresponding to the activation rate of said sensor units, each of said circuit means comprising a solid state switching device, a first current path connecting one of said light-activated sensor units with said solid state switching device, and a second current path between said one light-activated sensor unit and a solid state switching device in another of said circuit means.

5. Apparatus in accordance with claim 4, wherein each of said plurality of circuit means further includes current path means for rendering ineffective said means for activating said light-activated sensor units.

6. Position sensing apparatus for a disc-type variable reluctance motor having a stator with a plurality of spaced high magnetic permeability sections and having a rotor with a plurality of spaced high magnetic permeability sections, which comprises: a plurality of at least three light-activated sensor units; means for repeatedly and sequentially activating each of said plurality of light-activated sensor units when said high permeability rotor sections are in predetermined positions with respect to said high permeability stator sections; and a plurality of at least three interconnected circuit means for producing periodic electrical signals indicative of the positions of said high permeability rotor sections with respect to said high permeability stator sections, each of said plurality of interconnected circuit means comprising a solid state switching device, a first current path connecting one of said light-activated sensor units with said solid state switching device, and a second current path between said one light-activated sensor unit and a solid state switching device in another of said circuit means.

7. Apparatus in accordance with claim 6, wherein each of said plurality of circuit means further includes current path means for rendering ineffective said means for activating said light-activated sensor units.

* * * * *